Jan. 25, 1955   C. W. BERTHIEZ   2,700,717
AUTOMATIC CONTROL MECHANISM FOR MOVING MACHINE PARTS
Filed May 7, 1949   5 Sheets-Sheet 3

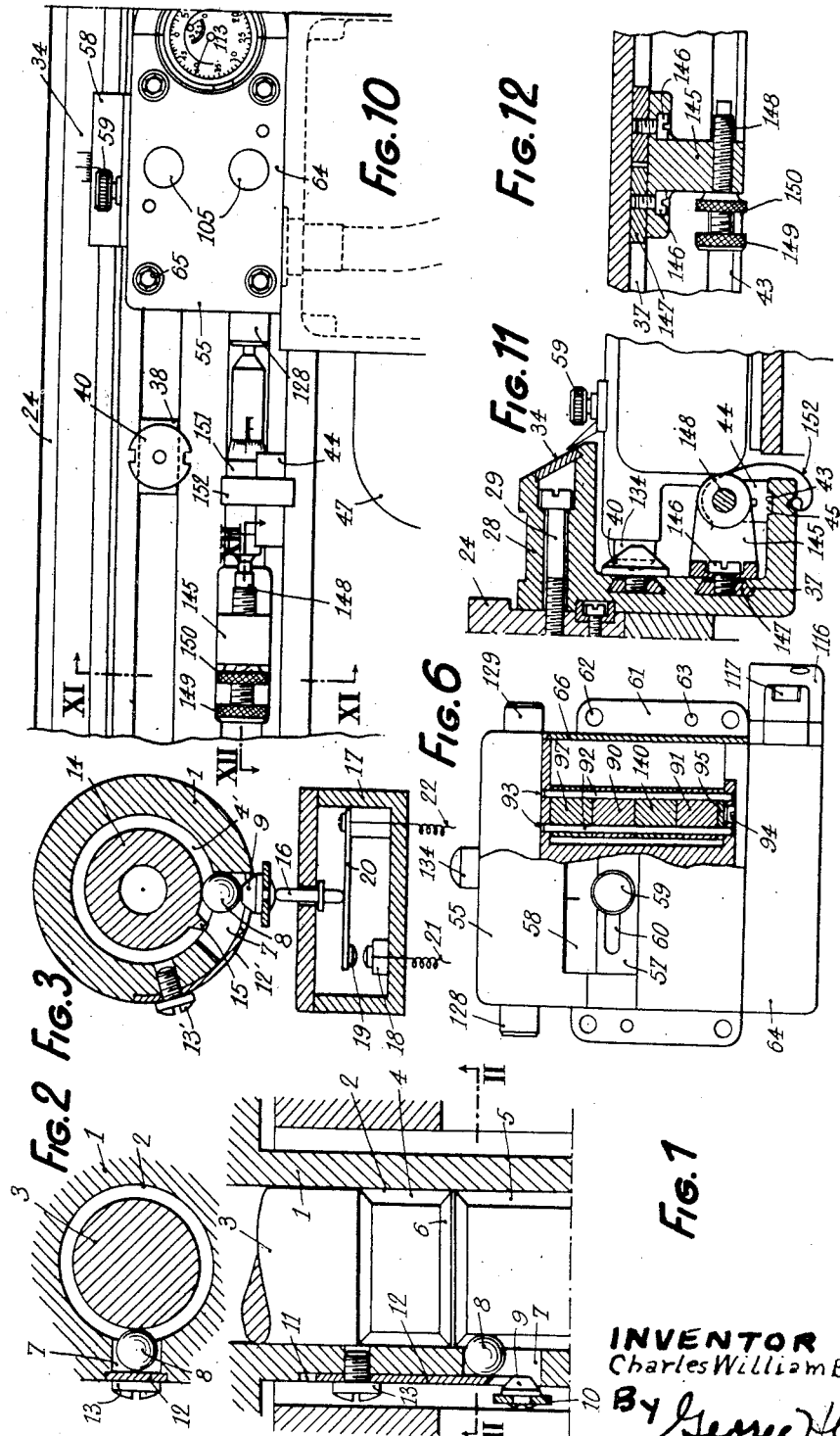

INVENTOR
Charles William Berthiez
By
ATTORNEY

Jan. 25, 1955   C. W. BERTHIEZ   2,700,717
AUTOMATIC CONTROL MECHANISM FOR MOVING MACHINE PARTS
Filed May 7, 1949   5 Sheets-Sheet 4
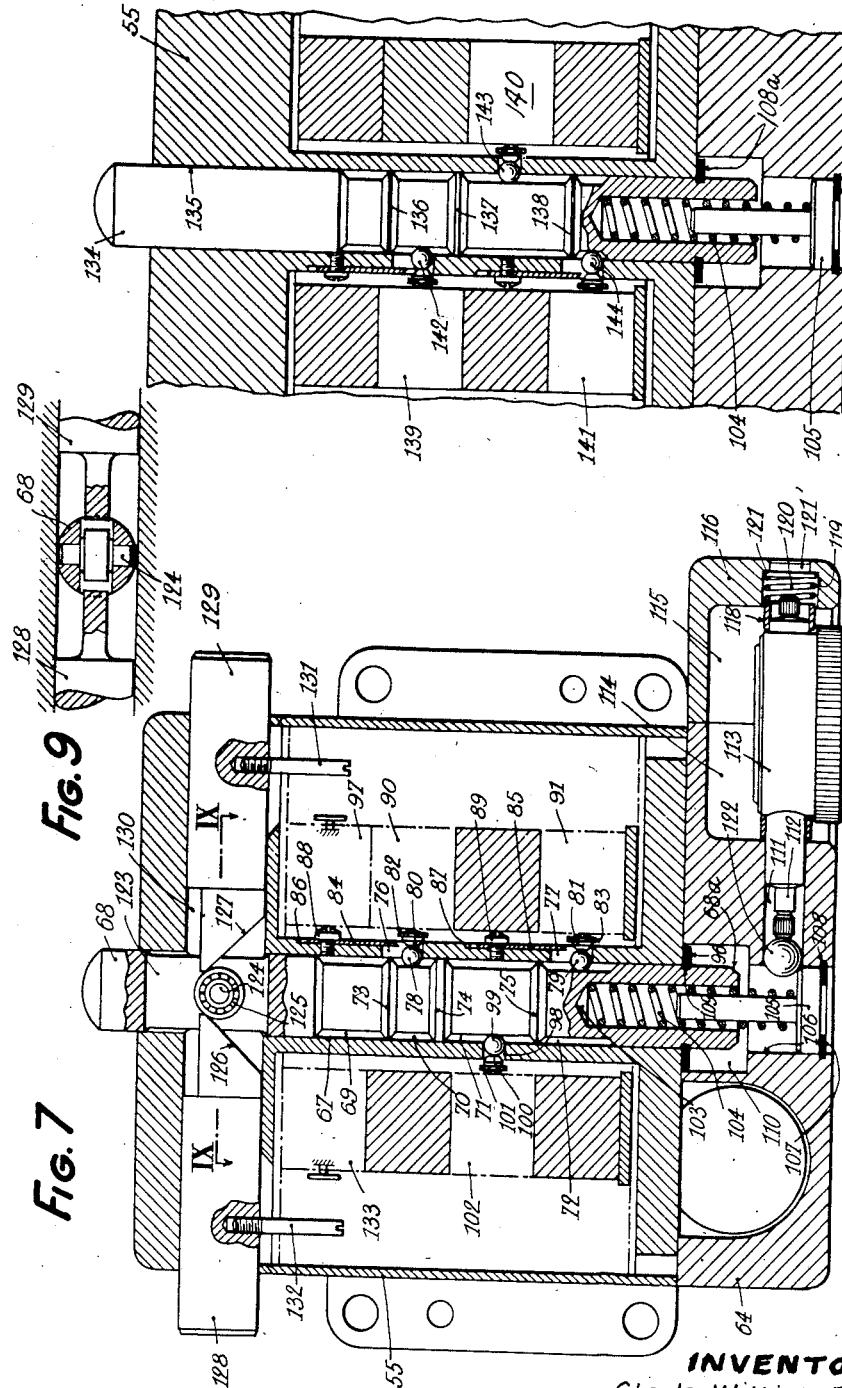
INVENTOR
Charles William Berthiez
BY George W. Cooney
ATTORNEY Jan. 25, 1955  C. W. BERTHIEZ  2,700,717
AUTOMATIC CONTROL MECHANISM FOR MOVING MACHINE PARTS
Filed May 7, 1949  5 Sheets-Sheet 5

INVENTOR
Charles William Berthiez
BY George H. Cosey
ATTORNEY

United States Patent Office 2,700,717
Patented Jan. 25, 1955

2,700,717
AUTOMATIC CONTROL MECHANISM FOR MOVING MACHINE PARTS

Charles William Berthiez, Paris, France

Application May 7, 1949, Serial No. 91,962

Claims priority, application France May 12, 1948

25 Claims. (Cl. 200—153)

This invention relates to a device for the mechanical unidirectional control of a member of the device to be actuated and the application thereof to the automatic control of a movable machine part.

The control device according to the present invention is so arranged that when its control member is moved in one direction the member to be actuated is actuated while when the control member is moved in the opposite direction the member to be actuated is not actuated.

The invention also relates to the application of a device of the kind described to the automatic control of the displacement of a movable part in a machine and more particularly a machine-tool.

Devices are known which operate like an abutment, being adapted to stop a movable member such as a machine-tool part accurately and automatically. Serious drawbacks are connected, however, with devices of this type. The main drawback lies in the fact that due to their abutment action the movable member cannot resume its movement in the same direction after having been stopped by the automatic control device, while, on the other hand, it is not possible to change the speed of the movable member at predetermined points along its path.

The device according to the invention renders it possible to avoid these drawbacks, being capable of stopping a movable machine member at a predetermined point of its path, and of causing this member to start again in the same or in the opposite direction. Furthermore, with the device according to the invention the speed of the movable member may be changed as desired at any predetermined point either by increasing or by reducing the speed in any predetermined manner.

The mechanical unidirectional control device according to the invention comprises, in combination, a movable control member having at least one projecting portion, a body with respect to which the control member is relatively movable, this body having an aperture open toward the movable control member and elongated in the direction of movement of that member in relation to said body, a resilient wall which partially covers the aperture on the side opposite to that movable control member, a movable element mounted freely in said aperture and projecting normally toward said movable control member, and an actuable member, such as an electric contact, cooperating with said element when the latter is in the portion of said aperture which is not covered by said resilient wall, said movable element being adapted, when the control member is moved in one direction, to be moved substantially at right angles to the direction of movement of the movable control member under the action of the projection carried by said control member in order to actuate the actuable member, said movable element being also adapted, when the same control member is moved in the opposite direction, to be driven into the aforesaid elongated aperture in the direction of movement of said control member under the action of said projection, in order to stop any cooperation with said actuable member.

According to a first embodiment of my invention, the movable control member is in the form of an axially movable cylindrical member having at least one circumferential rib arranged in a plane at right angles to its axis.

According to a further embodiment, the movable control member is a rotary shaft having a longitudinal rib or ridge adapted during the rotational movement of the shaft, to engage the movable element positioned in the circumferentially elongated aperture provided in the wall of the body in which said member is caused to move.

In the application of the control device to the automatic control of the operation of a movable machine part it is assumed, in accordance with the invention, that an assembly is provided which comprises a box equipped with a number of control members, such as for example electric contacts, adapted to control the variations of speed of said movable part, and a piston having ribs thereon in accordance with the first embodiment indicated above. The piston may extend substantially at right angles to the direction of travel of the movable part of the machine, adjustable heads or dogs having cam faces thereon being adapted to actuate said piston during the displacements of the movable machine part in order to obtain automatically variations of speed of said part at predetermined points of its travel, said box and said heads or dogs being carried respectively by a fixed portion of the machine and by the movable part thereof to be controlled, or vice versa.

Preferably, the assembly also comprises another piston adapted to be actuated by adjustable abutments and other actuable members for the purpose of stopping the movable machine part automatically at predetermined points along its stroke, while permitting said part to be subsequently restarted in either direction as desired.

In the drawings affixed to this specification and forming part thereof two embodiments of this invention and their application to a machine tool are illustrated diagrammatically by way of example.

In the drawings:

Figure 1 is a plan view, partly in horizontal section, of the first embodiment;

Figure 2 is a cross section along line II—II of Fig. 1;

Figure 3 is a sectional view of the second embodiment;

Figure 6 is a top view of the control assembly illustrated in Fig. 4 partly in horizontal section on line VI—VI of Fig. 4;

Figure 7 is a horizontal section, drawn to a larger scale substantially along line VII—VII in Fig. 4;

Figure 8 is a part-section, also on a larger scale, along line VIII—VIII of Fig. 5;

Figure 9 is a horizontal section of parts shown in Fig. 7 along line IX—IX;

Figure 10 is a front elevation similar to Fig. 4 with some additional details filled in.

Figure 11 is a vertical cross section on the line XI—XI in Fig. 10;

Figure 12 is a horizontal cross section on the line XII—XII in Fig. 10, and

Figure 4:
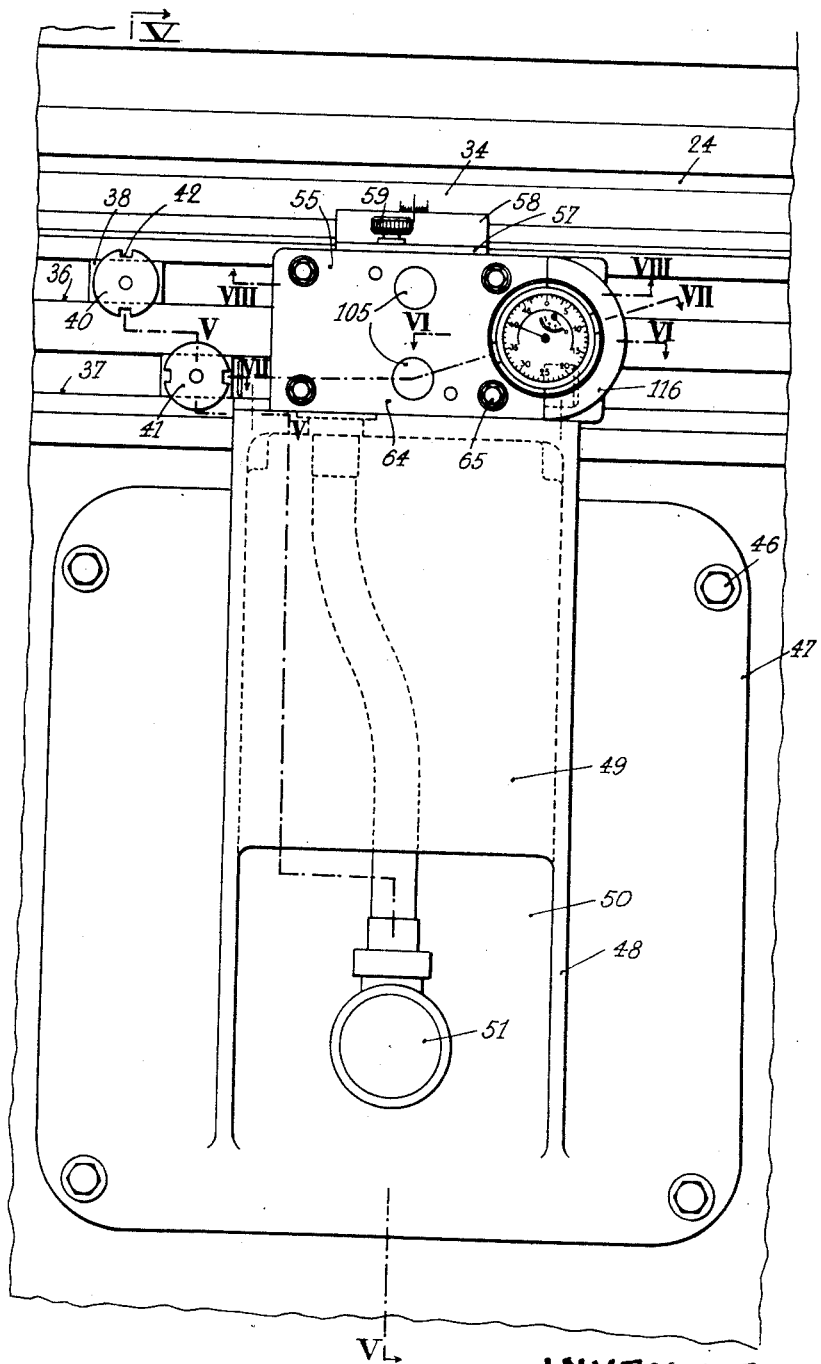
Figure 4 is a front elevation of part of a machine-tool fitted with controlling devices according to Figs. 1 and 2.

In the first embodiment shown in Figs. 1 and 2, of a device according to the invention, 1 is a body having a bore 2 in which a piston 3 formed with a pair of recesses 4 and 5 and an annular rib 6 between them is arranged for axial sliding movement.

In the wall of the body 1 is formed an aperture or slot 7, elongated to a certain extent in a direction parallel to the piston axis. A ball 8 is so positioned for sliding movement within the aperture 7 that, when the ball is located at one end of the aperture 7, it engages a contact stud 9 fixed at one end of a lead spring 10 having its other end fixed to the body 1.

In the body 1 is formed a groove 11 in which is inserted another leaf spring 12 held at one end by a screw 13, while its other end is adapted to partially cover the aperture 7 to provide an open space for stud 9.

Figure 3 illustrates a modified form of the device shown in Figs. 1 and 2. Here the axial movement of the control piston 3 is replaced by a rotary movement of a shaft 14. The aperture 7 is retained but instead of having its end walls parallel as in the case of Fig. 1 they extend radially. The leaf spring 12' is arc-shaped and secured in the recess formed in the body 1 by a screw 13'. The control shaft 14 is formed with a longitudinal rib 15 adapted to engage the ball 8 during the rotation of the shaft, in the same manner as the annular projection 6 engaged the ball when the piston 3 of Fig. 1 was moved axially. When the ball 8 is located at one end of the aperture 7 it can cooperate with the contact stud 9 as in the former case.

In both embodiments the contact stud 9 actuated by the ball 8 may depress the actuating member 16 of an electrical switch, as shown in Fig. 3, where the device described above is used in conjunction with the stud 9 of Figs. 1 and 2. The electrical switch may be enclosed, for example, in a box 17 and consist of a fixed contact member 18 and a movable contact member 19 carried by a leaf spring 20 engaging the actuating member.

The switching arrangement described is fed with current by a wire 21 connected to the fixed contact member 18, another wire 22 being connected to the movable contact member 19 by way of the leaf spring 20.

This device operates as follows:

Assuming that the parts of the device shown in Figs. 1 and 2 of the drawing are in the positions there shown, the contact members 18 and 19 actuated by the leaf spring 10 being open as shown in Fig. 3, the ball 8 will be moved along the slot 7 into engagement with the contact stud 9 when the piston 3 is moved downwardly in Fig. 1 parallel to the axis of this piston. Such a position of the ball 8 in engagement with the stud 9 is shown in Fig. 3 and may be accomplished by counterclockwise rotation of the shaft 14 to rotate the rib 15 into engagement with the ball to move this ball to the position shown in Fig. 3. The leaf spring 10 and the contact stud 9 are so disposed relative to the end wall of the slot that when the ball thus engages the stud 9 it also bears against the end wall and thus is prevented from further movement along the slot.

Upon continued downward movement of the piston 3 the rib 6 will press with camming action upon the ball to push the ball outwardly with respect to the axis of the piston 3 and thereby also press the stud 9 outwardly to move the push member 16 of the switch 17 to bring the members 18 and 19 into contact, thereby to close the switch. In Fig. 3 this camming action and outward movement of the ball are accomplished by continued counterclockwise rotation of the shaft 14. Since the ball 8 may not move further along the slot the rib 6 (or the rib 15 of Fig. 3) then may ride over and pass by the ball 8 to a position below the ball (Fig. 1) or at the right of the ball (Fig. 3), the spring 10 yielding to allow movement of the stud 9 as just described.

Immediately after the rib 6, 15 has passed by the ball this ball under the bias of the spring 10 returns toward the axis of the piston 3 and moves into the recess 4 at the upper side of the rib 6, Fig. 1, or at the left of the rib 15, Fig. 3. This action may take place with further downward travel of the piston, Fig. 1 or continued counterclockwise rotation of the shaft 14, Fig. 3, the switch 17 thereby again being opened.

If now the piston 3 of Fig. 1 is moved upwardly or the shaft of Fig. 3 is rotated in the clockwise direction, the rib 6 or 15 will engage the lower side of the ball 8, Fig. 1, or the right hand side of the ball in Fig. 3 and will move this ball upwardly in Fig. 1 or to the left in Fig. 3 from the position in which the ball engages the end wall of the slot and is in engagement with the stud 9 toward the other end of the slot, the ball in this reverse movement engaging the leaf spring 12, 12' and being held within the slot by this leaf spring. In such movement in either device the ball merely passes from its position in engagement with the contact stud 9, the switch now being open as described.

If piston 3 continues its upward travel (or shaft 14 its clockwise rotation), the rib 6 (or rib 15) will cause the ball 8 to abut against the upper (or left hand) end wall of the aperture or slot 7 and then cam the ball outwardly of the axis of the piston 3 or shaft 14 so as to cause it to push outwardly the free end of the spring 12 (or 12'). It is obvious, however, that during this second outward movement of the ball while the rib 6 (or rib 15) passes the ball, the ball will be positioned laterally of the stud 9 and not in operative engagement with it so that during the upward travel of the piston (or during the clockwise rotation of the shaft) the switching device 17 is not actuated after the ball has been moved from the flat surface of the stud 9.

After the annular rib 6 (or rib 15) has passed the upper (or left) end of the aperture or slot 7, the ball is allowed to recede into the recess 5 (or 4') under the influence of the leaf spring 12 or 12'.

When the next downward travel of piston 3 (or the counter-clockwise rotation of shaft 14) takes place, the ball 8 will immediately stop in engagement with stud 9 and the movements above described will be repeated.

To sum up, each downward stroke of the piston 3 (Fig. 1) or each counter-clockwise rotation of the shaft 14 (Fig. 3) actuates the switch 17, while the later is not actuated during the return stroke of piston 3 (or the clockwise rotation of shaft 14).

It is to be noted that the device here described operates in any position, since the ball is positively acted upon by the ribs 6 or 15.

It will be apparent also that the arrangement here described may be used for controlling any other type of switching device with any desired number of contact members, either front, back or double-throw contacts, instead of the front contact illustrated in Fig. 3.

I will now describe the application of the control device to the control of the travel of a table of a boring and milling machine on its bed, it being, however, obvious that the same control device may be fitted on any other machine for controlling a movable part.

Figure 5:
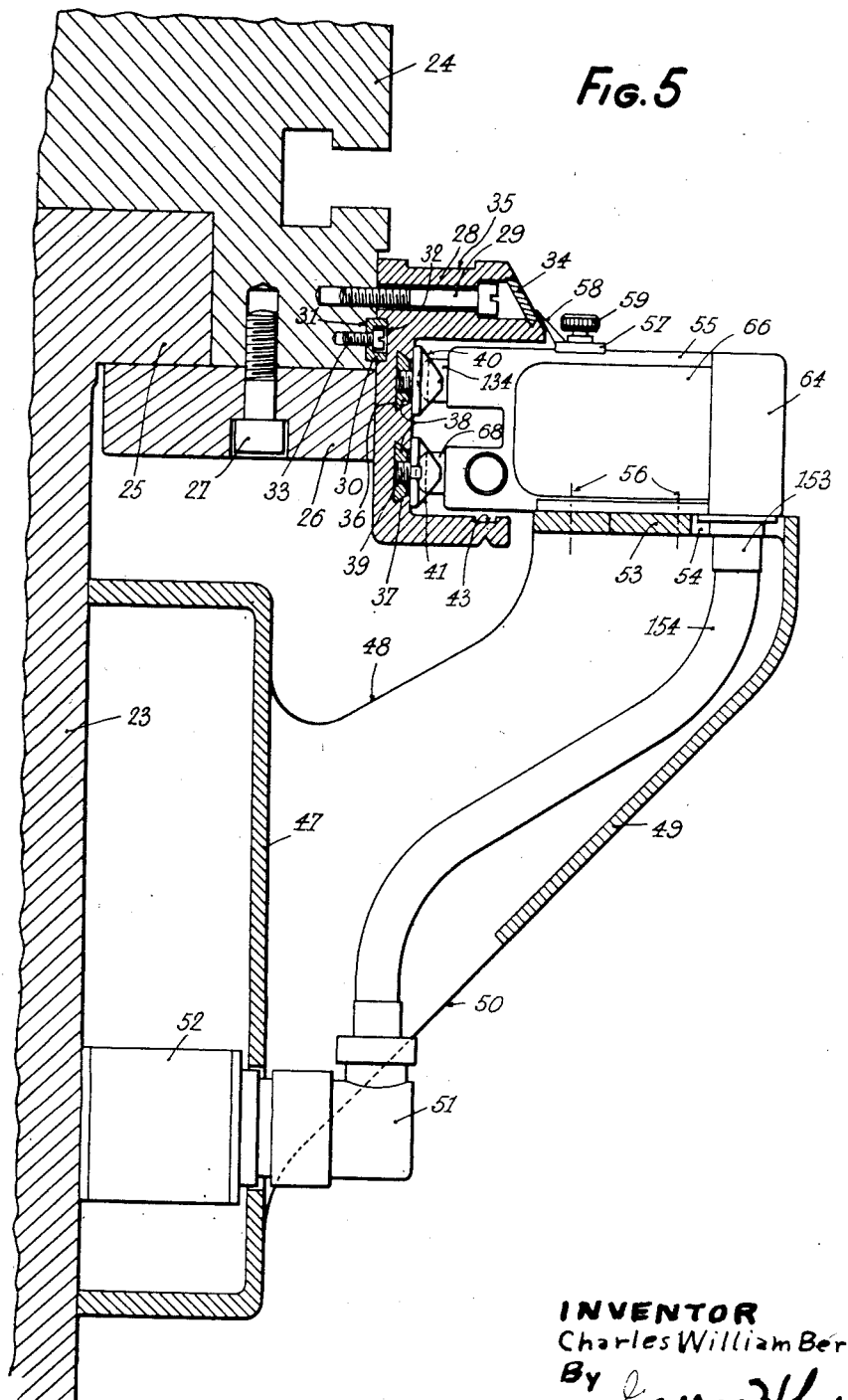
Figure 5 is a vertical section along line V—V of Fig. 4.

In Figs. 4 and 5 is shown part of the bed 23 of a boring and milling machine on which a table 24 is adapted to slide along the slideways 25 of the bed and is maintained thereon by means of detachable flanges 26 secured to the table by means of screws 27.

Along the lower edge of table 24 is secured by means of screws 29 a member 28 of substantially U-shaped section. A guiding gib 30 is fitted in grooves 31 and 32 provided in the table 24 and the member 28, respectively, in order to ensure an accurate positioning of the member 28 with respect to the table. The guiding gib may be secured to the table through any suitable means such as for example screws 33.

The front face of the upper flange of the member 28 is sloped and provided along its entire length with a graduated scale 34, while the upper face of the member 28 is formed with a groove 35 to prevent water or lubricant from flowing down the graduated scale 34.

The bottom of part 28 is formed with a pair of dovetailed grooves 36, 37 in which guide pieces 38 of corresponding cross-section are adapted to slide, these guide pieces having threaded holes 39 for fixing therein frustoconical heads or dogs 40 and 41 formed each with a pair of notches 42 serving to receive a suitable spanner for tightening the heads in place. It is thus possible to position and lock the heads or dogs 40 and 41 at any desired point along the grooves 36 and 37, respectively.

The heads or dogs 40 are provided in three different sizes, that is, different heights of the cone, which will be distinguished hereinafter as "low," "medium" and "large" sizes for reasons which will appear in the description of the operation of the device.

The lower flange of member 28 is formed with a longitudinal groove 43 of a width suitable for placing therein either standard gage blocks of the Johanson type or blocks such as 44 (see Figs. 10 and 11) having tenons 45 on their bottom faces for engaging the groove 43.

A hollow rectangular bracket 47 secured by means of screws 46, Fig. 4, to the machine bed 23 supports a projecting box formed with a pair of side walls 48 and a front wall 49 with a large aperture 50 near the bracket permitting the insertion of the plug member 51 of an electrical connection 52 secured on the machine bed 23 and serving a purpose which will be explained further below.

The walls 48, 49 of the box are connected on top to form a table 53 having an aperture 54 and on which table a contact-box 55 is secured by means of screws 56.

On the top surface of this box 55 is arranged a plate 57 carrying a slider 58 for adjusting the position of the box in relation to the graduated scale 34 fixed to the machine table. The plate 57 is clamped on the box 55 by means of a knurled button 59 the threaded shaft of which passes through a slot 60 (see Fig. 6) formed in in the plate 57.

This arrangement makes it possible to move the plate 57 relative to the box 55 and to adjust the slider 58 with respect to this same box.

Referring now more particularly to Figs. 6, 7 and 8 of the drawing, which illustrate constructional details of the box 55 and the various parts mounted therein, the box 55 is provided at its bottom with a base plate 61 (Fig. 6) having holes 62 for receiving screws for fastening the box to the table 53 integral with the machine bed.

Holes 63 are also provided in the base plate 61 for centering studs fixed to the table 53 to hold the box 55 in position on the table.

On the front of the box 55 is fitted a cover 64 secured by means of screws 65. The sides of the box are closed by two sliding plates 66 (Fig. 6).

Referring now to Fig. 7 the box 55 is formed with a vertical middle wall traversed by a horizontal bore 67, in which a piston 68 can move axially. This piston 68 is formed with four recesses 69, 70, 71, 72 and three annular ribs 73, 74, 75 between them, similar to those shown at 6 in Fig. 1.

Two slots 76, 77 similar to the slot 7 in Fig. 1 are formed in the wall of the box. In these slots are positioned balls 78 and 79 respectively, engaging studs 80 and 81 mounted on the free ends of leaf springs 82, 83 which are secured to the body of the box. The apertures are partially covered by two leaf springs 84 and 85, respectively, secured in grooves 86, 87 by screws 88, 89. These springs are adapted to engage in succession with balls 78 and 79 respectively.

Two switches 90 and 91 respectively are placed adjacent to and controlled by the springs 84 and 85. The switches are mounted on rods 92 (Fig. 6) received in holes 93 provided in the front and rear walls of the box 55. They are clamped in position by means of a screw 94 suitably carried in the front wall of the box, a plate 95 being inserted between the screw 94 and the first of said switches.

As may be seen in Fig. 6, four switches are provided in the arrangement shown, two switches 140 and 97 being disposed in alternate relation to and between the switches 90 and 91 for purposes to be explained further below.

The wall of box 55 has a circular hole 98 (Fig. 7) in which a ball 99 is disposed which engages a stud 100 carried by a leaf spring 101 which is mounted on the body of the box, this stud being adapted to actuate a switch 102 mounted in the box in the same manner as the other switches.

The inner end of the piston 68 (lower end Fig. 7) is formed with an axial bore 103 in which is inserted a coil spring 104 encircling a smaller piston 105, which has a relatively large head held in a bore 106 of the front wall by retaining ring 107 inserted in a groove 108. The axial movement of the main piston 68 is outwardly (upwardly in Fig. 7) limited by another retaining ring 96 fitting in a groove 109 of the piston 68.

A recess 110 in the cover 64 allows the retaining ring 96 free movement within the cover lengthwise of the axis with the piston 68.

A branch bore 111 extending at right angles to bore 106 houses the feeler member 112 of a comparator 113 mounted in a recess 114 of the front wall 64 and a cooperating recess 115 of an auxiliary cover 116 secured to the front wall by means of screws 117 (see Fig. 6). The shank 113' of comparator 113 is held in position in the cavity 111 of the cover 64, by means of a socket member 118 (Fig. 7) pressed against the head of the comparator and acted upon by a compression spring 120 seated on a shoulder 121 of the bore 119, a plug 121' closing the bore 119 on the outside.

The comparator can be tilted about the axis of its feeler member to facilitate the reading. The feeler member 112 is forced by the spring contained in the mechanism of the comparator against a ball 122 which in its position of rest engages the piston head 105. The front end (lower end Fig. 7) of the piston 68 is formed with edge 68a chamfered at 45° and adapted to engage the ball 122 when the piston is displaced axially downward in Fig. 7.

At the outer end (upper end Fig. 7) the piston 68 is formed with a slot 123 (Figs. 7 and 9) having a pin 124 extending therethrough and press-fitted in the piston. This pin carries a ball-bearing ring 125 contacted by cam faces 126, 127 formed on the inner ends of two pistons 128, 129 which are mounted for sliding movement in a bore 130 provided in the rear wall of the box 55 at right angles to and on the same level as the bore 67 in which piston 68 is disposed.

On the piston 129 is secured a pin 131 serving for actuating the switch 97 when the piston 129 moves towards the left (Fig. 7). The other piston 128 is likewise provided with a pin 132 which can engage and actuate another switch 133, when the piston 128 is moved to the right.

Above the piston 68 another piston 134 (Fig. 5) is mounted in another bore 135 (Fig. 8) of the middle wall A of the box. This piston 134 is provided with annular ribs 136, 137, 138 serving for actuating switches 139, 140, 141 through the intermediary of balls 142, 143, 144 respectively, when the piston is shifted axially. The two balls 142 and 144 are disposed in slots like the balls 78, 79 associated with piston 68, while the ball 143 is disposed in a hole like the ball 99 of piston 68.

The piston 134 is held in position within the box wall by means of a spring 104 and a piston 105 in the same manner as piston 68.

Figs. 10, 11 and 12 illustrate more details of the sliding table 24 and the U-shaped member 28 of the machine-tool controlled by the device according to the invention, described in the foregoing paragraphs.

In addition to the parts illustrated in Figs. 4 and 5, there is shown in Figs. 10, 11 and 12 a bracket 145 mounted by means of a pair of screws 146 on two dovetail pieces 147 identical with the pieces 38 and also disposed in the dovetailed groove 37 for movement to different positions therealong.

The bracket 145 is provided with an adjustable abutment comprising a spindle 148 threaded therein and carrying a knurled head 149 and clamped in the position of adjustment by means of a lock-nut 150 on the threaded spindle (Figs. 10 and 12).

On U-shaped block 44 seated in the groove 43 is fitted a micrometer 151 (Fig. 10) held in position by a spring 152. The arrangement of the parts is such that the adjusting spindle 148 and the micrometer 151 are in axial alignment with the piston 128 (Fig. 7) for cooperation therewith or with the other piston 129 when the abutment device is mounted on the other side of the box 55.

Standard gage blocks, such as Johanson gage blocks referred to hereinabove placed in the groove 43, may be used as intermediate abutment pieces between the spindle 148 and the piston 128.

The electrical contacts provided in the box 55 are connected to the different devices adapted to stop the feeding movement of the machine table or to vary its speed, through the medium of electric wires issuing from the box 55 by means of a connector 153 (Fig. 5) from which a tube 154 leads to the plug member 51 fitting into socket member 52 of the machine bed as described above.

The control device according to this invention, applied to a machine-tool as shown in Figs. 4–12, operates as follows:

When the machine-tool, that is, in the example selected for illustration, the boring and milling machine, is in operation, the boring tool or cutter rotates while the workpiece is clamped on the table 24. The feed is provided by the travel of the table along the slideways 25 of the bed 23.

The control device described makes it possible on the one hand, to vary the speed of the feed movement of the table at predetermined points of its travel by using the heads or dogs 40 disposed at these points in the groove 36 and cooperating with the upper piston 134 of the contact box 55 and, on the other hand, to stop the movement of the table at predetermined points of its travel by employing either the heads or dogs 41 positioned at the corresponding points, in the groove 37 in cooperation with the lower piston 68 of the contact box 55, or the spindle 148 mounted on the bracket 145 which is also secured in the groove 37 and may be adapted to cooperate with either of the pistons 128, 129 of the contact box 55.

Figure 13:
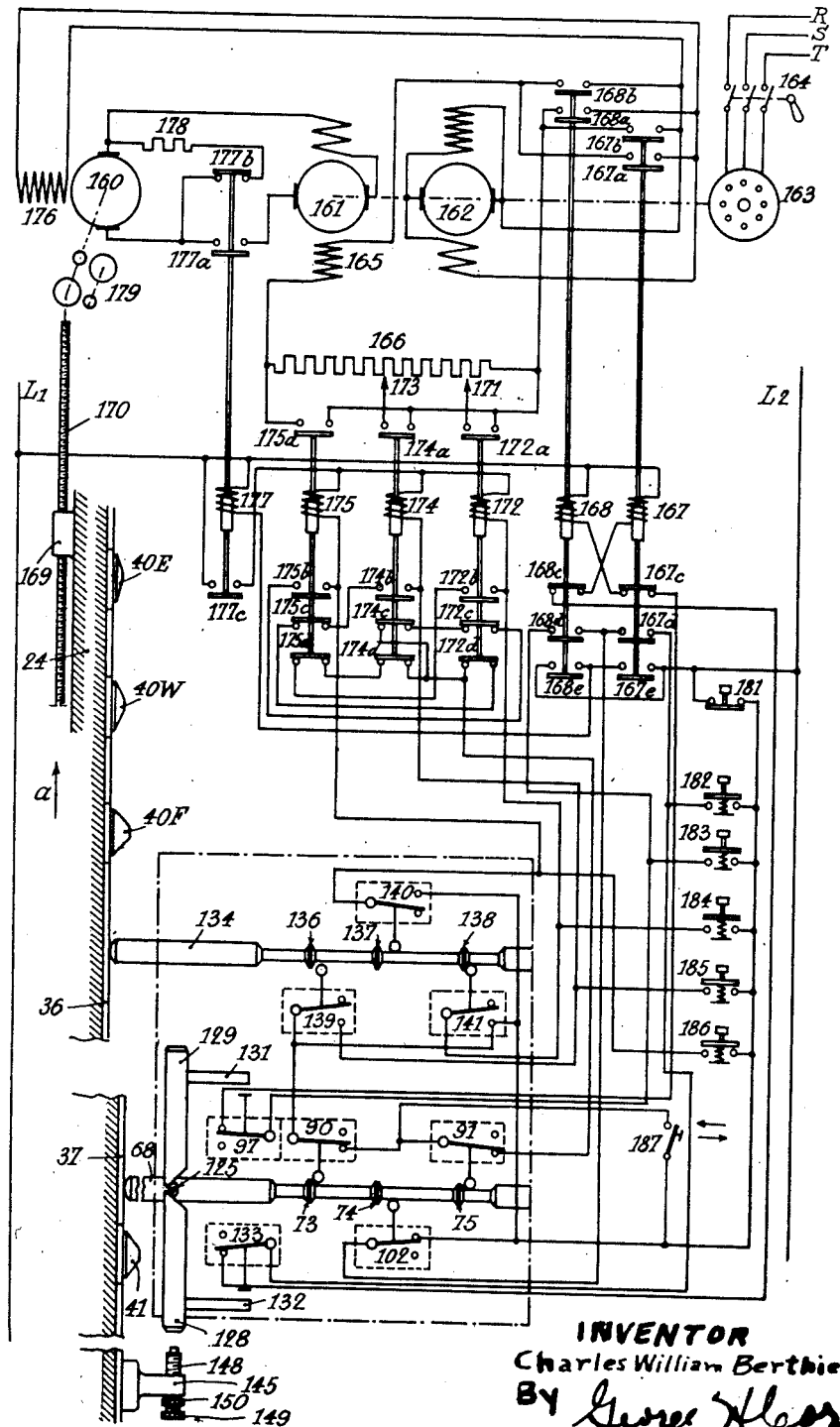
Figure 13 is an electric wiring diagram.

Considering first the change of speed, it will be sufficient to point out that if "low" heads 40 are used, when they engage the piston 134 during the travel of the table 24 on the bed 23, as described in connection with Figs. 5 and 8, they act as cams to depress this piston against the force of the spring 104 and cause the rib 138 to push the ball 144 outwardly so as to close the switch 141. It will also be apparent that the heads 40 of "medium" height will push the piston 134 farther away so that the rib 136 will actuate the ball 142 and thereby close the switch 139. When "large" heads 40 are fitted in they will operate to cam the piston 134 still farther inside the box so that the rib 137 in turn will depress the ball 143 and thus close the switch 140. The positions of the ribs 136, 137, 138 along the piston 134 are determined relative to the balls 144, 142, 143 and their slots or holes so as to accomplish the operation of the switches in the desired order. An arrangement of heads 40 of different heights for cooperating with the piston 134 is shown in Fig. 13.

The switches 139, 140, 141 are adapted to control devices which in turn control the various feed speeds of the machine table 24, so that, if it is desired to impart to the table a certain speed from a predetermined point of its travel or stroke, this can be done by simply placing a head or dog 40 at the corresponding point in the groove 36, the "low," "medium" or "large" size of this head being selected according to the switch to be actuated in relation to the desired speed.

The variable-speed system has not been described, as it may be of any known type. It may be merely pointed out that the balls which control the switches 139, 141, are positioned in elongated slots in accordance with the characteristic feature described in connection with Fig. 1 in order to make it impossible, after a predetermined speed has been set up by a depression of the piston 134, that this action be neutralized by the unexpected or undesired setting up of another speed during the return stroke of the piston 134, due to one of its ribs engaging on its return stroke another ball than that depressed during the depression stroke.

However, in the case of ball 143 which in the embodiment of Fig. 8 is actuated by heads of greater height, that is, each time the piston 134 is fully depressed, such an interference cannot occur and the ball 143 is therefore positioned in a cylindrical hole.

The electrical circuits of the switches 139, 140, 141 (shown in detail in Fig. 13) are provided, of course, with the usual electric locking devices for preventing the simultaneous engagement of different speeds.

When it is desired to stop the table at a predetermined point of its travel, while permitting it to restart subsequently in the same direction, the operator employs the heads 41 fitted in the other groove 37 and arranged for cooperation with the piston 68.

In order to stop the table at the precise point desired, the table speed should first be lowered so as to bring it down to a value equalling substantially the minimum feed speed; and then only the table is stopped from that constant speed. Thus, the accuracy of stopping is rendered independent from the working or cutting speed generally used in the machine-tool.

According to the size of the tool or workpiece or both, or in order to obtain fast speeds, a direct drive and a drive through the medium of a train of gears or a "backgear" may be required. It is therefore logical, when the table is under direct drive, to start the deceleration which precedes the stop a little sooner than when the table is driven at reduced speed by means of the train of gears. This is the reason why the arrangement comprises a switch 90 for slowing down the table speed from the direct drive, this switch being controlled by the rib 73 of piston 68, Figs. 7 and 13, under the influence of a head 41, a switch 91 for controlling the decrease of speed when the drive operates through the train of gears, this switch being actuated by the rib 75 of piston 68, and finally a stop switch 102 controlled by the rib 74 of piston 68.

It will be seen that from the moment when the head or dog 41 engages the piston 68, the switch for lowering the speed from the direct drive is actuated first, then the switch for slowing down the speed from the drive through the train of gears and finally the stop switch are successively actuated. Thus the arrangement described renders it possible to cause the table to start again in the same direction after it has been stopped by the automatic control device, since the head 41 will not meet any other actuatable means after it has depressed and then cleared the piston 68.

When it is desired to stop the table with the utmost accuracy at a point beyond which it shall not be driven further, the spindle 148 supported in bracket 145 (Figs. 10 to 12) is used which may cooperate with either piston 128 or piston 129, according to the direction of movement of the table.

If piston 128 is used, when the end of spindle 148 engages it or the end of the micrometer 151 cooperating therewith, the piston will be driven into its bore 130 and the cam face 126 provided at its inner end will act on the piston 68 through the medium of the ball bearing 125 in the same manner as when piston 68 is acted upon directly by the head 41. The switches which decrease the speed either in direct drive, or with the train of gears inserted in the drive, will first reduce the table speed to a value near the minimum speed and then, just before the switch 102 becomes operative, the stop switch 133 is actuated by the pin 132 fixed to the piston 128, Fig. 7. The reason for providing this stop switch 133 will be readily understood if it is considered that it is actuated directly by the piston 128 on which pressure is exerted longitudinally through the intermediary of the spindle 148, whereby a much greater accuracy of the stopping point can be obtained than by using the cooperation of a camming head or dog 41 with the spherical end of the piston 68.

High accuracy of stopping is achieved by controlling the piston 68 by means of heads 41, i. e. these stops always occur exactly at the same place, but it will be apparent that to determine these stopping points beforehand in a very accurate manner is a difficult matter. In contrast thereto the use of the pistons 128, 129 renders it possible to employ either the micrometer 151 shown in Fig. 10 or Johanson gage blocks which may be placed in the groove 43 against the end of the spindle 148.

The position of the table 24 relative to the machine bed 23 can be determined approximately by means of the slider 58 which is moved in front of the graduation 34, and in a most accurate manner by means of the comparator 113 actuated by the inner end of the piston 68 engaging the ball 122.

The cam faces 126, 127 of the pistons 128, 129 as well as the chamfered edge 68a of the inner (lower) end of the piston 68, Fig. 7, are set at 45° so that the feeler member 112 of the comparator 113 will be moved by an amount equal to the displacement of either the piston 68, or pistons 128 or 129.

It is apparent that the device described is of very simple character and allows the feed speed of a machine table to be varied at any desired and preselected points of its travel. It is only necessary to place at the corresponding places on the table, heads 41 of suitable size (height) which are called upon to produce a change of speed at the corresponding points of the workpiece engaging the tool.

Furthermore, with the device described the machine table may be stopped in two different manners, namely, in the first case, by employing heads 41 mounted at those points of the table which correspond to the desired stopping points, from which the table may be then started again in either direction, and, in the other case, by using spindles 148 supported in brackets 145 for stopping the table in either direction of travel with a great accuracy of predetermined value. In this case the table can be started again only in the opposite direction.

I will now describe the way in which the device shown in combination with a moving part of a machine effects by means of electrical connections different controlling actions. In Fig. 13, the arrangement of the parts in relation to each other is somewhat modified for the sake of clearness and only those mechanical parts are shown which are necessary for the understanding of the operation of the device, for example the stop controlling pistons 68, 128 and 129 and the speed changing piston 134, a camming head or dog 41 serving for stopping the table during its travel and an abutment spindle 148 for stopping the table at the end of its travel, both these instrumentalities being mounted in the groove 37 of the member 28 carried by table 24, together with three speed changing camming heads or dogs 40E, 40W and 40F which control the points in the displacements of the table and the speeds at which engagement, working or cutting and high speed operation of the tool respectively are effected. These three heads or dogs, as explained in the foregoing description, are mounted for adjustment in the groove 36 of the member 28 carried by table 24 and are of the low, medium and large kind, respectively, in order to impart different stroke lengths to the speed changing piston 134.

The diagram also illustrates the motor 160 which drives the table 24 by means of mechanical connections shown in a purely diagrammatic manner in the form of an internally threaded member or nut 169 having a correspondingly threaded spindle 170 passing therethrough which is rotated by the motor 160 either directly or through the medium of a back-gear or train of gears 179. The motor 160 forms part of a Leonard unit or group comprising a generator 161, an exciter 162 and a three phase motor 163 for driving the Leonard unit fed from a main supply R S T through a main switch 164. The shunt field windings 165 of the generator 161 are fed from the exciter 162 through a rheostat 166 and contact members 167a and 167b of a relay 167 or through contacts members 168a and 168b of a relay 168, according to whether it is desired to have one or another polarity applied to the generator for rotating the motor 160 in a given or the opposite direction. The rheostat 166 is provided with a pair of sliding contacts or sliders, one of these, the engagement speed slider 171, making it possible to short-circuit a predetermined portion of the rheostat resistance through the intermediary of a contact member 172a of an engagement speed relay 172 and another (working speed) slider 173 permitting also a variable portion of the rheostat resistance to be short-circuited through a contact member 174a of a working speed relay 174. Finally, when contact member 175a of a high speed relay 175 is actuated, the entire resistance 166 is short-circuited.

The shunt field windings 176 of the working motor 160 are fed with a constant voltage from the exciter 162 and the variations of speed of this motor which drives the table are obtained only through appropriate variations of the input voltage of the generator shunt field by modifying accordingly the resistance of the generator field rheostat. By energizing relay 177 to close the contact 177a the input circuit of motor 160 may be closed and another contact 177b, when the relay is not energized, will short-circuit the armature winding of the motor 160 through a braking resistance 178.

The various relays already mentioned above are provided with a number of additional contact members 167c, 167d, 167e, 168c, 168d, 168e, 172b, 172c, 172d, 174b, 174c, 174d, 175b, 175c, 175d, 177c, for operating the control circuits of the device which will be described later on. Contact members 167c and 168c are provided for locking electrically the relays 167, 168 in order to prevent their simultaneous energization. Contact members 167d, 168d, 172b, 174b and 175b are the holding contacts of relays 167, 168, 172, 174 and 175, respectively. Contact members 167e and 168e are provided for energizing the relay 177 for both directions of rotation of the motor. Contact members 172c, 172d, 174c, 174d, 175c and 175d form the electrical locking contacts of relays 172, 174 and 175, respectively, for preventing a plurality of these relays from being energized at the same time.

A number of push-buttons is also represented in the diagram, namely a general stopping button 181, a starting button 183 for left-hand rotation, a starting button 182 for right-hand rotation, an engagement speed button 184, a working speed button 185 and a high speed button 186.

The electrical arrangements shown include also a switch 187 which should be normally closed when the motor 160 drives the table 24 through back-gearing 179, and open when direct drive is applied to the table. The purpose of this switch is to ensure the greatest stopping accuracy no matter at what speed the table is moved as already explained in the foregoing specification.

In the diagram it is assumed that switch 187 is open, or closed by hand, according to whether the table was previously driven directly or through back-gearing but it will be apparent to those skilled in the art that this switch may be actuated automatically by the back-gear 179 connecting and disconnecting member, either by means of mechanical device or an electrical relay.

The control circuit assembly is fed from a suitable source of current shown as a pair of lines L1 and L2 on either side of the diagram.

The arrangement described above operates as follows:

Assuming that the work to be done requires the table 24 to be driven directly by the motor 160 and not through the back-gearing, the switch 187 will be in its open position as shown in the figure.

To set the table moving the main three phase cut-out switch 164 first is closed. The generator 161 and exciter 162 are thus caused to rotate, but the motor 160 is not yet energized since contact members 167a, 167b, 168a and 168b are still open, so that the generator is not energized, while contact member 177a is also open, relay 177 not being energized. It will now be assumed that the operator wants to move the table in the direction of the arrow a in Figure 13. For this purpose he will depress the starting push-button 182 for right-hand feed and thereby cause relay 167 to be energized from lines L1 and L2 through contact members 168c and switches 133 and 182. Relay 167 will remain energized after the push-button 182 has been released, due to its holding contact 167d closing the energizing circuit through line L1, winding 167, contact 168c, switch 133, contact 167d, switch 102, switch 181 and line L2. The energization of relay 167 closes both contact members 167a and 167b and therefore energizes the field windings 165 of the generator. The generator will thus energize in turn motor 160 under the minimum voltage since the entire resistance of the rheostat 166 is included in the field winding circuit of the generator.

Energization of relay 167 will also close contact member 167e controlling the energization of relay 177, thereby closing its contact member 177a while opening its contact member 177b. The generator 161 now supplies current to the motor armature and since shunt field 176 of the motor is energized by the exciter the motor will rotate at its lowest speed.

In order to bring the workpiece near the tool and to save time, it will be advantageous to move the table at high speed. To this end the high speed button 186 is depressed and relay 175 is now energized through the following circuit: line L1, contact 177c, relay 175, switch 186, switch 181, line L2. After releasing the push-button 186, relay 175 will remain energized through its holding circuit comprising line L1, contact member 177c, winding 175, holding contact 175b, contact 172c, contact 174c, switch 91, switch 90, switch 181 and line L2. Energization of relay 175 will thus close the contact member 175a and thereby short-circuit the rheostat 166 of the generator. The generator will now operate under maximum voltage conditions and the motor 160 will drive the table at high speed.

A camming head or dog 40E has been so adjusted in groove 36 of the table 24 as to engage piston 134 just before the tool engages the workpiece. As this head 40E is of the low kind, it will cause piston 134 to actuate only switch 141 through the intermediary of its annular rib 138. The closing of switch 141 causes relay 172 to be energized through line L1, contact member 177c, winding 172, switch 141, switch 181, line L2, thus closing contact member 172a and opening contact members 172c and 172d. It will be apparent that, when contact member 172c inserted in the holding circuit of relay 175 is opened as described, this relay 175 will be deenergized since switch 140 is still open. Contact member 175a will open and the voltage supplied by the generator is reduced to a value corresponding to the position of slider 171 now in service. Relay 172 is still energized by means of its holding contact 172b through the following circuit: Line L1, contact member 177c, winding 172, contact member 172b, contact member 175d, contact member 174d, switch 91, switch 90, switch 181 and line L2. Under these conditions, the table 24 will be driven at engagement speed. The tool now engages the workpiece and the feed speed may therefore be increased. At that moment the medium size head or dog 40W engages the piston 134 and the annular piston rib 136 will actuate and close the switch 139, so that the working speed relay 174 will be energized through a circuit comprising line L1, contact member 177c, winding 174, switch 139, switch 181, line L2. The holding circuit is constituted as follows: line L1, contact member 177c, winding 174, contact member 174b, contact member 175c, contact member 172d, switch 91, switch 90, switch 181, line L2. Energization of relay 174 closes contact member 174a and inserts the working speed slider 173 in the circuit, short circuiting a greater portion of the rheostat and increasing the speed of motor 160. The engagement speed relay 172 is now deenergized since its holding circuit is opened at contact 174d. The table will thus be moved at working speed.

Assuming the tool to leave the workpiece, for example at a reduced speed obtained by using another low-speed camming head or dog 40E actuated in the manner already described above, if it is now desired to move the table automatically at high speed, as accomplished by hand as above described by depressing the push-button 186, it will be sufficient to mount a high speed camming head or dog 40F at the suitable point of the groove 36. This dog will cause the piston 134 to go through its maximum stroke, so that the rib 137 actuates the switch 140 which will in turn close the circuit for energizing the high speed relay 175 as follows: line L₁, contact member 177c, winding 175, switch 140, switch 181, line L₂. The energizing of relay 175 will therefore open the holding circuit of relay 174 by opening contact member 175c and will open the holding circuit of relay 172 by opening contact 175d. The table will thus travel at high speed.

Oviously any desired succession of speeds could be obtained either by manually operating the push-buttons 184, 185, and 186 at the moment when such speed changes are to be made, or by adjusting correspondingly the position of a number of camming heads or dogs such as 40E, 40W, 40F at the points where the corresponding variations of speed shall take place.

In order to stop the hand controlled motion the push-button 181 is depressed, whereby the holding circuit of relay 167 is opened and contact members 167a and 167b are opened. The field windings 165 of generator 161 are thereby deenergized and the energizing circuit of relay 177 is interrupted at contact 167e. Contact member 177a also opens and contact member 177b closes, thus short-circuiting the armature winding of the motor 160 through the braking resistance 178, and the motor is braked since its field windings 176 are fed by the exciter 162 which has not been stopped.

As regards the automatic stopping, it will be understood from the above description that transitory stopping could be accomplished under the control of heads or cams, such as 41, fixed in groove 37 of the table member 28 and acting upon the lower piston 68, these devices allowing the table to be started again either in the same or in the opposite direction. The table may also be stopped by means of end stops such as spindle 148 acting either upon piston 128 or piston 129, and in this case the table will start again only in the opposite direction.

A description will be now given of the manner in which the two kinds of stopping take place and it will be therefore assumed that the table 24 is being moved at engagement feed speed. The reasoning would be the same for any other speed condition. It will also be assumed first that the table is driven directly from the motor 160, while according to another assumption it is driven through backgear.

Considering now the first assumption, switch 187 is open and relays 167, 177 and 172 are energized according to the circuits described above. The camming head or dog 41 will stop the table in accordance with the following sequence of operations: dog 41 actuates piston 68 which opens switch 90 by means of its annular rib 73, thereby cutting out the holding circuit (as already explained) of relay 172. The entire resistance of rheostat 166 is thus included in the energizing circuit of the generator field and the motor rotates at a low speed corresponding to the minimum speed of the table. Now, while the table is still travelling at this reduced speed, the dog 41 drives the piston 68 farther into its cylinder and causes it to open switch 91, which is also inserted in the holding circuit of relay 172 (in the present instance of direct drive the opening of this switch 91 has no consequence, because this holding circuit was already cut out by the opening of switch 90). The table continues to be driven at minimum speed and after a very short period of time the same dog 41 pushes the piston 68 still further and the piston will now open the switch 102 inserted in the holding circuit of relay 167. This relay is thereby deenergized and, according to the procedure described in detail hereinabove, the table is stopped instantaneously.

Considering now the second assumption in which the table is driven by the motor 160 through backgear, switch 187 is closed. When the camming head or dog 41 acts upon pston 68 it will perform the same functions as in the former assumption but with different results. Thus, first switch 90 will be open (which is without consequence as this switch is short-circuited by the closed switch 187). Switch 91 then will also open and thereby open the holding circuit of relay 172, and finally switch 102 will open also to deenergize relay 167 and cause the table to stop as above described. It will be noted, as pointed out at the beginning of the description, that when the table is driven through the backgear, i. e. at reduced speed, the passage at minimum speed takes place somewhat later than when it is driven directly (switch 90).

If at the moment when it is desired to stop it, the table is already travelling at minimum speed, it will be obvious that the opening of switch 90 and 91 would have no result, since none of the relays 172, 174, 175 would be energized at that moment. When actuating switch 102, the operation would be effected under the same conditions since the table would also be driven at minimum speed. The use of an end-stroke stop or abutment spindle 148 adapted to cooperate with piston 128 would lead to an operation comparable with that resulting from the actuation of dog 41 cooperating with piston 68 with the only difference that, as explained above, in order to ensure a greater accuracy of stopping the opening of the holding circuit of relay 167 is obtained by opening the switch 133 actuated directly by the control pin 132 carried by piston 128 instead of opening the switch 102 actuated through the medium of ball-bearing 125, piston 68 and its annular rib 74.

Of course, the explanations given above would be the same if the table were moved in the opposite direction, i. e. by causing motor 160 to rotate in the reverse direction, and the same explanations are valid if push-button 183 or push-button 182 are substituted for the manually controlled starting, and relay 168 for relay 167 for automatic operation.

It will also be noted that in the last mentioned assumption the table can not be started again in the same direction because switch 133 is held open by piston 128 which is held in its fully depressed position by the stop 148, so that relay 167 can not be energized. On the contrary, there is nothing to prevent relay 168 from being energized in order to start the table in the opposite direction. The operation would be the same for stopping the table at the end of its stroke in the reverse direction and the above explanation may serve for this case by merely substituting relay 168, piston 129, control pin 131 and switch 97 for relay 167, piston 128, control pin 132 and switch 133, respectively.

On the other hand, when the table is stopped by means of the transitory head or dog 41, switch 102 is opened only during the short period during which the ball 99 (see also Fig. 7) is depressed by the passage of the annular rib 74 and then switch 102 closes again. Thus, the table may be started again in either direction at will.

Various changes may be made in the design and operation of the devices described without departing from the invention or sacrificing the advantages thereof.

I claim:

1. A control device comprising a body, an actuating member supported by said body for movement thereof in a predetermined relation to said body, said body being provided with a slot having its length extending in the direction of said movement of said member relative to said body and open at the side thereof toward said member, means carried by said body and disposed at the side of said slot opposite to said open side thereof so as to cover said slot at said opposite side for a portion of said length thereof and to leave uncovered another portion of said length, an element in said slot movable lengthwise of said slot and adapted for engagement with said slot covering means when said element occupies said covered portion of said slot, said element being formed so as to project from said slot at the open side thereof toward said actuating member when said element is in engagement with said slot covering means, a part carried by said actuating member and adapted to engage said element projecting from said slot to move said element along said slot upon movement of said actuating member in said predetermined relation to said body, and a control member supported so as to be movable between two control positions and disposed in relation to said element for engagement of said control member by said element upon movement of said element along said slot toward said uncovered portion of said slot, means for arresting said movement of said element along said slot upon said engagement of said control member by said element, said element engaging part carried by said actuating member being adapted to effect movement of said arrested element laterally of said movement of said actuating member to move said control member from a given one of said positions to the other, said element and said part carried by said actuating member being adapted thereafter to provide for passing said part by said arrested element so that said control member is released for movement from said other position.

2. A control device as defined in claim 8 which comprises means for arresting said reverse movement of said element along the covered portion of said slot, and bias means engageable with said arrested element in said covered portion of said slot to bias said element toward said actuating member while yielding to provide for movement of said element outwardly from said member against said bias upon engagement of said part carried by said actuating member with said element to provide for passing said part by said element so arrested in said reverse movement of said actuating member.

3. A control device as defined in claim 1 in which said actuating member is in the form of a rod supported by said body for movement lengthwise of said rod, said body extending about said rod and providing said slot adjacent said rod lengthwise thereof, said part carried by said actuating member being provided by a projection outwardly from said rod for engagement with said element in said slot.

4. A control device as defined in claim 3 in which said part projecting from said rod is in the form of a circumferentially extending rib, said body extending about said rod providing space for movement of said rib relative to said body adjacent and along said slot upon said movement of said rod lengthwise thereof.

5. A control device as defined in claim 3 in which said rod is cylindrical and said projection is in the form of an annular rib extending outwardly therefrom circumferentially about said rod, said body being formed to provide a cylindrical space within which said rod and said rib move axially of such cylinder, said slot extending in said body parallel to said axis of said cylinder and opening inwardly into said space along the length of said slot.

6. A control device as defined in claim 1 in which said actuating member is a shaft supported by said body for rotational movement thereof within said body extending about the axis of said shaft, said slot being formed in said body with its length extending circumferentially about said axis of said shaft, said shaft being provided with a part projecting outwardly therefrom for engagement with said element in said slot, said body being formed with a recess therein extending circumferentially about the axis of said shaft and providing for movement in said recess of said projecting part upon rotational movement of said shaft, said element projecting from said slot into said recess for said engagement by said part projecting from said shaft.

7. A control device as defined in claim 1 in which said element is a ball, said part carried by said actuating member being adapted to effect said lateral movement of said ball by camming action thereon upon said movement of said actuating member, said control member being disposed for engagement with said ball in said uncovered portion of said slot to effect said movement of said control member from said given position to said other position.

8. A control device as defined in claim 1 in which said actuating member is supported in said body for reciprocating movement of said actuating member lengthwise of said slot, said part carried by said actuating member after passing said element being engageable with said element to move said element reversely along said slot out of engagement with said control member upon reverse movement of said actuating member without effecting lateral movement of said control member.

9. In a machine having two parts one movable relative to the other in a predetermined path of movement, the combination with means carried by a given one of said parts for initiating a function of said machine in said relative movement of said parts, of a control device adapted to be actuated by said function initiating means upon said relative movement of said parts, said control device comprising a body, an actuating member supported by said body for movement thereof in a predetermined relation to said body, said body being provided with a slot having its length extending in the direction of said movement of said actuating member relative to said body and open at the side thereof toward said member, means carried by said body and disposed at the side of said slot opposite to said open side thereof so as to cover said slot at said opposite side for a portion of said length thereof and to leave uncovered another portion of said length, an element in said slot movable lengthwise of said slot and adapted for engagement with said slot covering means when said element occupies said covered portion of said slot, said element being formed so as to project from said slot at said open side thereof toward said actuating member when said element is in engagement with said slot covering means, a part carried by said actuating member and adapted to engage said element projecting from said slot to move said element along said slot upon movement of said actuating member in said predetermined relation to said body, and a control member supported so as to be movable between two control positions and disposed in relation to said element for engagement of said control member by said element upon the the movement of said element along said slot toward said uncovered portion of said slot, means for arresting said movement of said element along said slot upon said engagement of said control member by said element, said element engaging part carried by said actuating member being adapted to effect movement of said arrested element laterally of said movement of said actuating member to move said control member from a given one of said positions to the other, said element engaging part being adapted thereafter to provide for passing said part by said element so that said control member is released for movement from said other position, said control device being supported by the other of said machine parts for engagement of said function initiating means with said actuating member of said control device for effecting said movement of said actuating member and said movement of said control member.

10. In a machine having two parts one movable relative to the other in a predetermined path of movement, the combination as defined in claim 9 in which said function initiating means provides a cam surface adapted to engage said actuating member of said control device upon said relative movement of said machine parts for effecting said movement of said actuating member to move said control member to said other position.

11. In a machine having two parts one movable relative to the other in a predetermined path of movement, the combination as defined in claim 10 in which said means providing said cam surface is formed to pass by said actuating member after camming action thereon to provide for reverse movement of said actuating member after said release of said control member from said other position thereof, said part carried by said actuating member cooperating with said element to move said element reversely along said slot out of engagement with said control member upon reverse movement of said actuating member without effecting lateral movement of said control member.

12. In a machine having two parts one movable relative to the other in a predetermined path of movement, the combination as defined in claim 9 in which said control device is supported by said other machine part so that the direction of movement of said actuating member of said device is transverse to said path of relative movement of said parts of said machine, said function initiating means providing a cam surface adapted to engage said actuating member of said control device for effecting said transverse movement of said actuating member in said predetermined relation to said body of said control device to move said control member from said given to said other position.

13. In a machine having two parts one movable relative to the other in a predetermined path of movement, the combination as defined in claim 9 which comprises an auxiliary movable member supported by said other machine part for movement in a predetermined relation to said body of said device and in the direction generally parallel to said path of relative movement of said parts of said machine, means operatively connecting said auxiliary movable member with said actuating member of said control device for effecting said movement of said actuating member upon said movement of said auxiliary movable member, and means carried by said given one of said parts of said machine and adapted to engage said auxiliary movable member adjacent a predetermined position of said other machine part relative to said given part thereof for producing said movement of said auxiliary movable member relative to said body to produce said movement of said actuating member to actuate said control member.

14. In a machine having two parts one movable relative to the other in a predetermined path of movement, the combination as defined in claim 13 in which said means carried by said given part of said machine and adapted to engage said auxiliary movable member is provided with adjustment means for adjusting the point in the relative movement of said machine parts at which said means carried by said given part engages said auxiliary movable member to actuate said control member.

15. In a machine having two parts one movable relative to the other in a predetermined path of movement, the combination with means carried by a given one of said parts for initiating a function of said machine in said relative movement of said parts, of a plurality of control devices supported by the other of said machine parts and adapted to be actuated by said function initiating means upon said relative movement of said machine parts, each of said control devices being constructed as defined in claim 1, said function initiating means carried by said given one of said machine parts comprising a plurality of separately effective means respectively associated with said control devices and supported by said given one of said machine parts so as to be adjustably positioned in different positions along said path of relative movement of said machine parts and so as to engage and actuate the respective actuating members of said control devices for controlling different functions of said relatively moving machine parts at predetermined points in the relative movement thereof.

16. In a machine having two parts one movable relative to the other in a predetermined path of movement, the combination as defined in claim 9 in which said actuating member of said control device carries a plurality of said parts respectively adapted to engage a plurality of said elements respectively movable lengthwise of a plurality of slots provided in said body of said control device, said element engaging parts carried by said actuating member respectively being adapted to engage said elements respectively to actuate a plurality of control members, at least one of said element engaging parts and the element engaged thereby being adapted to provide for passing said part by said element in said movement of said actuating member, and a plurality of said function initiating means carried by said given machine parts in spaced relation in the direction parallel to said predetermined path of movement and respectively adapted to move said actuating member of said control device different distances from an initial position of said actuating member, said elements in the respective slots and the control members respectively cooperating therewith being positioned with respect to said element engaging parts carried by said actuating member so that said control members are actuated in succession corresponding to the successive engagement of said function initiating means with said actuating member of said control device.

17. A control device as defined in claim 15 in which said body supports said actuating member for forward and reverse movement thereof and provides a plurality of said slots disposed in spaced relation along the line of movement of said actuating member, a plurality of said elements respectively in said slots and movable lengthwise thereof, said actuating member of said control device carrying a plurality of said element engaging parts respectively adapted to engage said elements to effect said movement thereof lengthwise of the respective slots, a plurality of said control members respectively disposed adjacent said slots and adapted to be engaged by the respective elements in said slots to move the respective control members from said given positions to said other positions thereof in the forward movement of said actuating member and thereafter to provide for passing the respective element engaging parts by the respective elements in said forward movement to release the respective control members for movement from said other positions thereof, said element engaging parts and the respective elements being adapted for engagement thereof to provide for movement of said elements respectively reversely along said slots past the respective control members upon reverse movement of said actuating member, said elements being operatively disconnected from the respective control members in said reverse movement to prevent movement of said control members from said given positions thereof.

18. In a machine having two parts one movable relative to the other in a predetermined course of movement, the combination with means carried by a given one of said machine parts for initiating a function of said machine in said relative movement of said parts, of a control device comprising an actuating member supported by the other of said machine parts so as to successively to be engaged by and disengaged from said function initiating means in said relative movement of said machine parts in a given direction, said actuating member being supported by said other machine part for movement of said member forwardly and reversely relative to said other machine part respectively upon such engagement and disengagement of said actuating member, and control means adapted to control a given function of said machine and supported by said other machine part adjacent the path of movement of said actuating member and actuated by said actuating member in a given position of said actuating member in said forward movement thereof in said path, said actuating member being movable beyond said given position in said forward movement in said path and in such further movement releasing said control means, and means actuated by said actuating member in said given position of said actuating member in the reverse movement thereof for preventing actuation of said control means so as to prevent said given function of said machine in such reverse movement of said actuating member.

19. In a machine having two parts one movable relative to the other in a predetermined course of movement, the combination with a plurality of means carried by a given one of said machine parts and disposed along said course of movement for initiating in succession a series of functions of said machine in said relative movement of said machine parts, of a control device comprising an actuating member supported by the other of said parts of said machine so as successively to be engaged by and disengaged from the respective function initiating means in succession in said relative movement of said machine parts, in a given direction said actuating member being supported for movement of said member forwardly and reversely relative to said other machine part respectively upon such engagement and disengagement thereof by and from the respective function initiating means, a plurality of control means supported by said other machine part in spaced relation along the path of movement of said actuating member and respectively adapted to control different functions of said machine, a plurality of control actuating means carried by and disposed on said actuating member in spaced relation along said path of movement of said member and respectively engaging said control means in different positions of said actuating member along said path for respectively actuating said control means, the disposition of said several control actuating means on said actuating member in relation to said control means providing for actuation of said control means in succession in a given order in the forward movement of said actuating member to control in succession the different functions of said machine, the respective function initiating means being of different shapes so as to engage said actuating member of said control device to produce different lengths of movement of said actuating member so as to effect actuation of said respective control means in said given order, and means actuated by said actuating member in the reverse movement of said actuating member to effect disengagement of said actuating means respectively from said control means to prevent actuation of the respective control means in said reverse movement of said actuating member.

20. In a machine having two parts one movable relative to the other in a predetermined course of movement, the combination as defined in claim 18 which comprises an auxiliary movable member supported by said other machine part for movement relative to said other machine part, means operatively connecting said auxiliary movable member with said actuating member of said control device for effecting said forward movement of said actuating member upon said movement of said auxiliary movable member, and means carried by said given one of said parts of said machine and adapted to engage said auxiliary movable member adjacent a predetermined position of said other machine part relative to said given machine part for producing said movement of said auxiliary movable member to produce said movement of said actuating member to actuate said control means.

21. In a machine having two parts one movable relative to the other in a predetermined course of movement, the combination as defined in claim 18, in which said function initiating means comprises an element providing a camming surface engaging said actuating member for effecting said forward movement of said actuating member in a said path of movement thereof from an initial position, and means connected to said actuating member for effecting reverse movement thereof to said initial position upon the completion of said camming movement by said element and disengagement of said element from said member.

22. In a machine having two parts one movable relative to the other in a predetermined course of movement, the combination as defined in claim 21 in which said camming element is of conical shape with the axis of the cone perpendicular to said predetermined course of relative movement of said machine parts and is disposed with the apex of the cone toward said actuating member for camming engagement with said actuating member in said relative movement of said machine parts, the height of said cone determining the movement of said actuating member forwardly in said path of movement thereof from said initial position.

23. In a machine having two parts one movable relative to the other in a predetermined course of movement, the combination as defined in claim 22 in which said conical camming element is provided with a cylindrical base portion concentric with the axis of the cone and having a surface transverse to said axis and bearing on a surface of said given machine part that is parallel to said course of relative movement of said machine parts for determining the position of said camming element with respect to said actuating member.

24. In a machine having two parts one movable relative to the other in a predetermined course of movement, the combination as defined in claim 19 in which said plurality of function initiating means comprises a plurality of elements of conical shape carried by said given machine part and disposed with the axes of the cones perpendicular to and in spaced relation to each other along said predetermined course of relative movement of said machine parts and with the apices of the cones toward said actuating member for camming engagement of the respective conical elements in succession with said actuating member in said relative movement of said machine parts, the respective heights of said conical elements determining the movements of said actuating member forwardly in said path of movement from an initial position.

25. In a machine having two parts one movable relative to the other, the combination with a function initiating element carried by a given one of said machine parts and movable therewith in a predetermined course of movement for initiating a function of said machine in said relative movement of said parts, of a control device comprising an actuating member supported by the other of said machine parts adjacent said course of movement of said element so as in succession to be engaged by and disengaged from said element in said relative movement of said machine parts in a given direction, said actuating member being supported by said other machine part for movement of said actuating member forwardly from and reversely to an initial position relative to said other machine part respectively upon such engagement thereof by and disengagement thereof from said element, control means adapted to control a given function of said machine and supported by said other machine part adjacent the path of movement of said actuating member and actuated by said actuating member in a given position of said member in said forward movement thereof in said path, and an intermediary element engaged by said actuating member in said given position of said actuating member in the forward movement of said actuating member and engaging said control means to actuate said control means, said actuating member in said forward movement thereof being movable beyond said given position, means preventing forward movement of said intermediary element with said actuating member beyond said given position so that said actuating member passes out of engagement with said intermediary element and said control means to deactuate said control means, said intermediary element being engaged by and movable with said actuating member in the reverse movement thereof from said given position to said initial position out of engagement with said control means so as to prevent actuation of said control means in said reverse movement of said actuating member to make said control means ineffective to produce said given function of said machine in said reverse movement of said actuating member.

References Cited in the file of this patent

UNITED STATES PATENTS

| Number | Name | Date |
|---|---|---|
| 2,181,829 | Jeffrey | Nov. 28, 1939 |
| 2,184,611 | Cobbett | Dec. 29, 1939 |
| 2,239,400 | Pitt et al. | Apr. 22, 1941 |
| 2,328,266 | Durbin | Aug. 31, 1943 |
| 2,370,701 | Woodbury | Mar. 6, 1945 |